May 31, 1927.
R. A. NORTH
WATER FILTER
Filed April 20, 1923
1,630,274
3 Sheets-Sheet 1
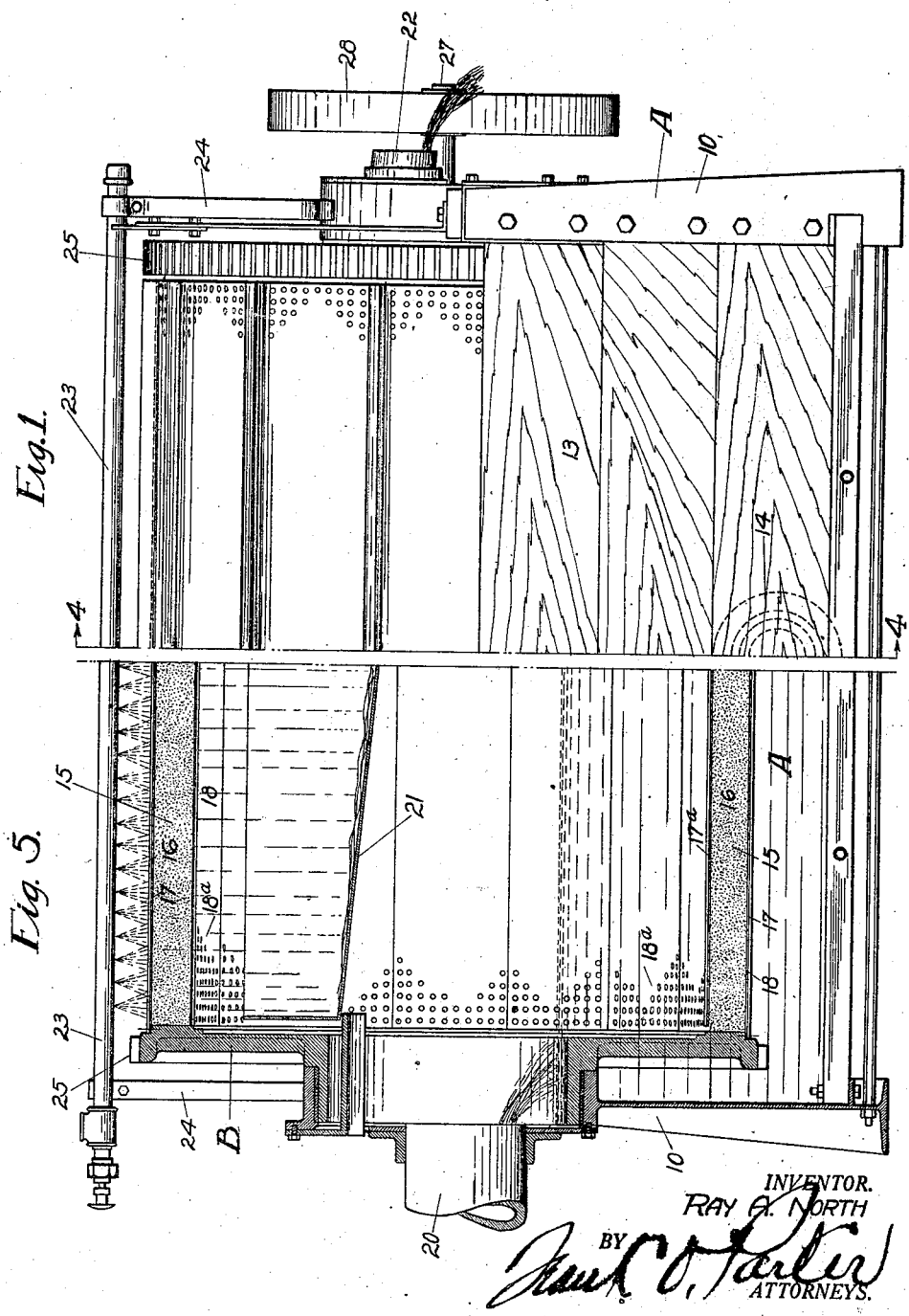
INVENTOR.
RAY A. NORTH
BY
ATTORNEYS.

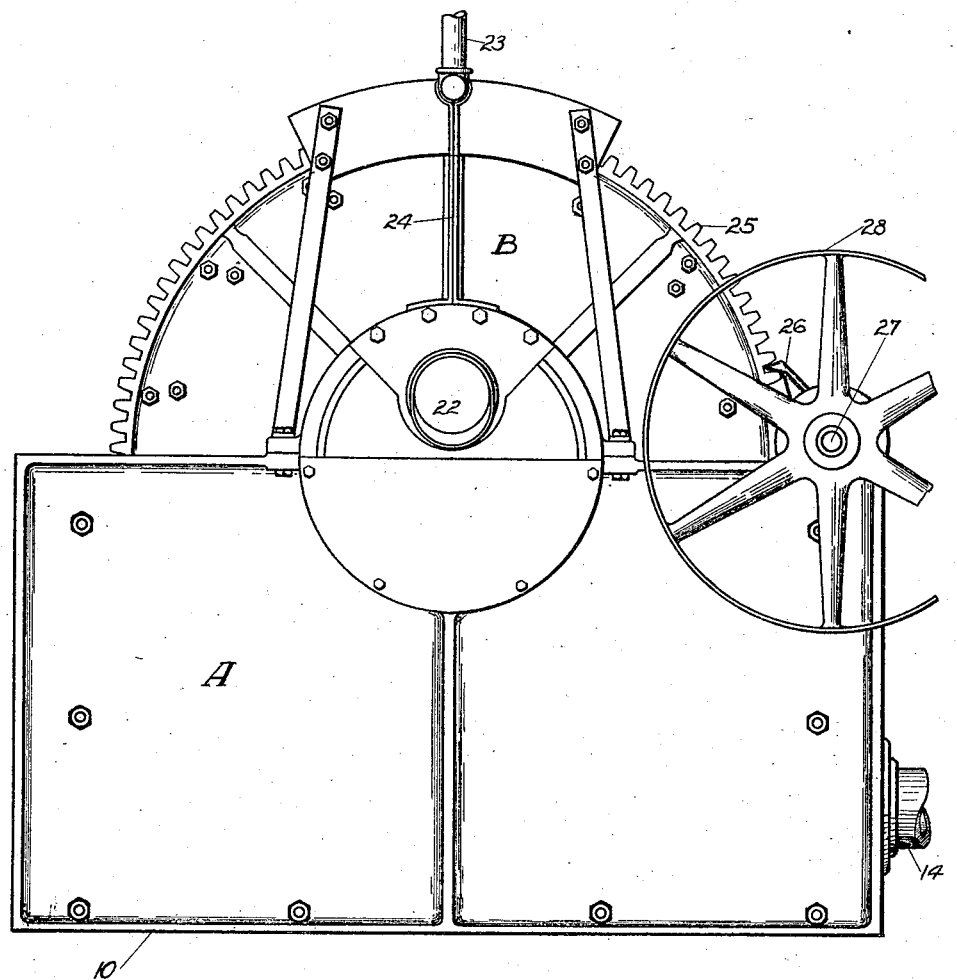

May 31, 1927.  R. A. NORTH  1,630,274
WATER FILTER
Filed April 20, 1923   3 Sheets-Sheet 3
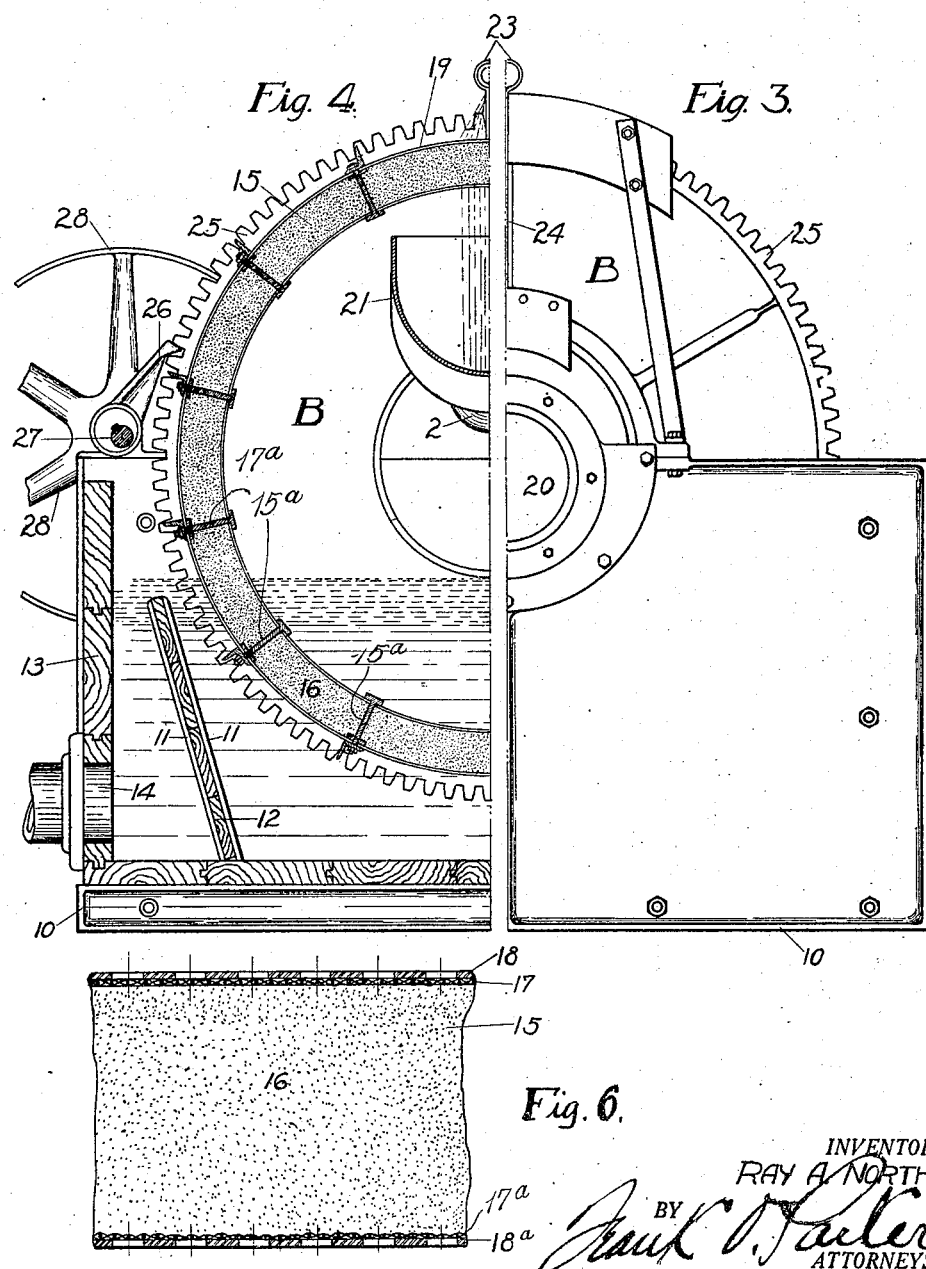

Patented May 31, 1927.

1,630,274

UNITED STATES PATENT OFFICE.

RAY A. NORTH, OF GREEN BAY, WISCONSIN.

WATER FILTER.

Application filed April 20, 1923. Serial No. 633,416.

The invention relates to a filtering apparatus, and more especially to the class of water filters.

The primary object of the invention is the provision of a machine of this character, wherein the filtering elements are arranged in a rotor, which revolves at an extremely low rate of speed, so as to permit the water to percolate through the filtering elements to remove all foreign matter from the water, the clean water being let off at one end of the machine, while the foreign matter from the filtering elements is discharged from the other end of said machine.

Another object of the invention is the provision of a machine of this character, wherein the construction thereof is novel in form, and in the construction and arrangement of parts the filtering elements will be thoroughly cleaned to render the machine sanitary and operative at all times.

A further object of the invention is the provision of a machine of this character, wherein the filtering elements are continuously washed to remove all foreign matter therefrom, and the dirty water is discharged therefrom during the operation of said machine.

A still further object of the invention is the provision of a machine of this character, which is comparatively simple in construction, thoroughly reliable and efficient in operation, strong, durable, and inexpensive in manufacture and installation.

With these and other objects in view the invention consists in the features of construction, combination and arrangement of parts as will be hereinafter fully described, illustrated in the accompanying drawings, and pointed out in the claim hereunto appended.

In the accompanying drawings:

Figure 1 is a fragmentary side elevation of a machine constructed in accordance with the invention, a portion of the reservoir being broken away.

Figure 2 is an end elevation.

Figure 3 is a similar view looking toward the opposite end.

Figure 4 is a sectional view taken on the line 4—4 of Figure 1.

Figure 5 is a vertical longitudinal sectional elevation.

Figure 6 is a fragmentary sectional detail view of the filtering element.

Similar reference characters indicate corresponding parts throughout the several views in the drawings.

Referring to the drawings, in detail, A designates generally a reservoir, which may be made from any suitable material, having the desired loading capacity, and formed on the inner faces of opposed end walls 10, of this reservoir are cleats 11, for supporting dam boards 12, which extend the required height in the reservoir to regulate and maintain a predetermined water level within the latter. Opening through the side wall 13, adjacent to the dam boards 12, is a clean water outlet conduit 14, for the delivery of the filtered water therethrough.

Revolubly supported centrally of the reservoir A, is a drum or cylinder B, comprising spaced outer and inner wire-mesh cylindrical walls 17, and 17$^a$, respectively, the space therebetween being divided by radially disposed longitudinally extending partitions 15$^a$, to form peripherally arranged relatively deep pockets 15, for holding filtering material 16, such as sand or any other material which may be used for filtering purposes. Each of the pockets has fitted therein an outer reticulated covering 18, for retaining the filtering material therein, while the inner periphery of said drum or cylinder B, is also fitted throughout the area of each pocket with a reticulated covering 18$^a$, the coverings 18, being inset a distance from the outer periphery of said drum or cylinder B, so as to provide an outside trough 19, to each pocket, for a purpose presently described.

Opening through one end of the reservoir A, and drum or cylinder B, at the axis of rotation of the latter is an inlet 20, through which is pumped the water to be filtered, while arranged interiorly of the said drum or cylinder B, above the axis of rotation of the same is an inclined trough 21, directed toward the other end of said drum or cylinder B, and at its outer end constituting an outlet 22, for the discharge of dirty water delivered from the pockets 15, as the machine is operated.

Above the drum or cylinder B, centrally thereof is a spray pipe 23, into which is fed clean water for the spraying or sprinkling thereof into the troughs 19, so that said water will percolate through the filtering material 16, in the pockets 15, for removing all foreign matter therefrom and delivering the same into the inclined imperforate inner trough or chute 21, for the discharge thereof at one end of the machine while in operation.

The pipe 23, is supported in standards 24, suitably mounted at opposite ends of the machine.

At opposite ends of the drum or cylinder B, are ratchet gears 25, with which engage the teeth of eccentrics 26, carried by a rotary shaft 27, journaled in suitable bearings, mounted on the ends of the reservoir A, the said shaft 27 being fitted on one end with a belt wheel 28, adapted to be driven from any suitable source of power. It will be apparent that by the eccentrics 26, the drum or cylinder B, will be revolved at an extremely low rate of speed, thereby enabling the proper filtering of the water let into the drum or cylinder B, during the rotation thereof.

The filtered water is delivered through the pockets 15, into the reservoir A, and discharged therefrom over the dam boards 12, through the conduit 14, from the machine.

What is claimed is:

A water filter, comprising a reservoir, a hollow revoluble drum supported in the reservoir and having widely spaced outer and inner annular sectional walls, each wall including superimposed double sections, the outermost sections being formed with relatively large perforations and the innermost sections being of fine wire mesh, radially disposed longitudinally extending partitions between the sections to form independent noncommunicating pockets between the walls, the pockets being inset relative to the outer periphery of the drum, filtering material entirely filling the pockets, an inlet conveyor opening into the drum axially thereof at one end of the same, and an inclined imperforate chute supported within the drum and having its discharge end opening through the other end of the drum above its axis.

In testimony whereof I affix my signature.

RAY A. NORTH.